L. H. DES ISLES.
ELECTRICAL THERMOMETER SYSTEM.
APPLICATION FILED JAN. 21, 1918.
1,304,277.
Patented May 20, 1919.
2 SHEETS—SHEET 2.
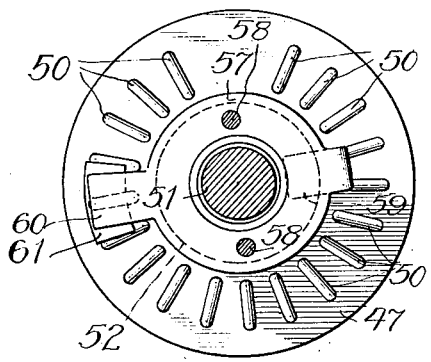
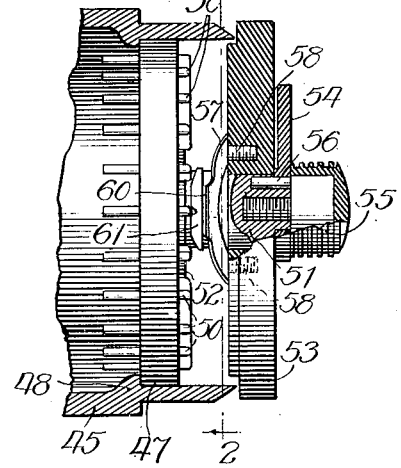
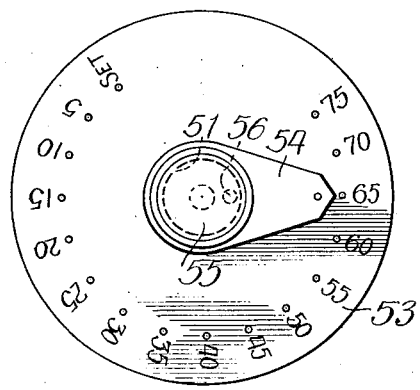
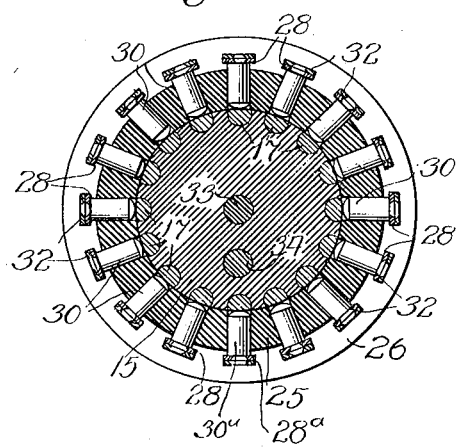
Witness:
Chas. R. Koursh.
Inventor.
Leonard H. Des Isles
By: Peirce, Fisher & Clapp, Attys.

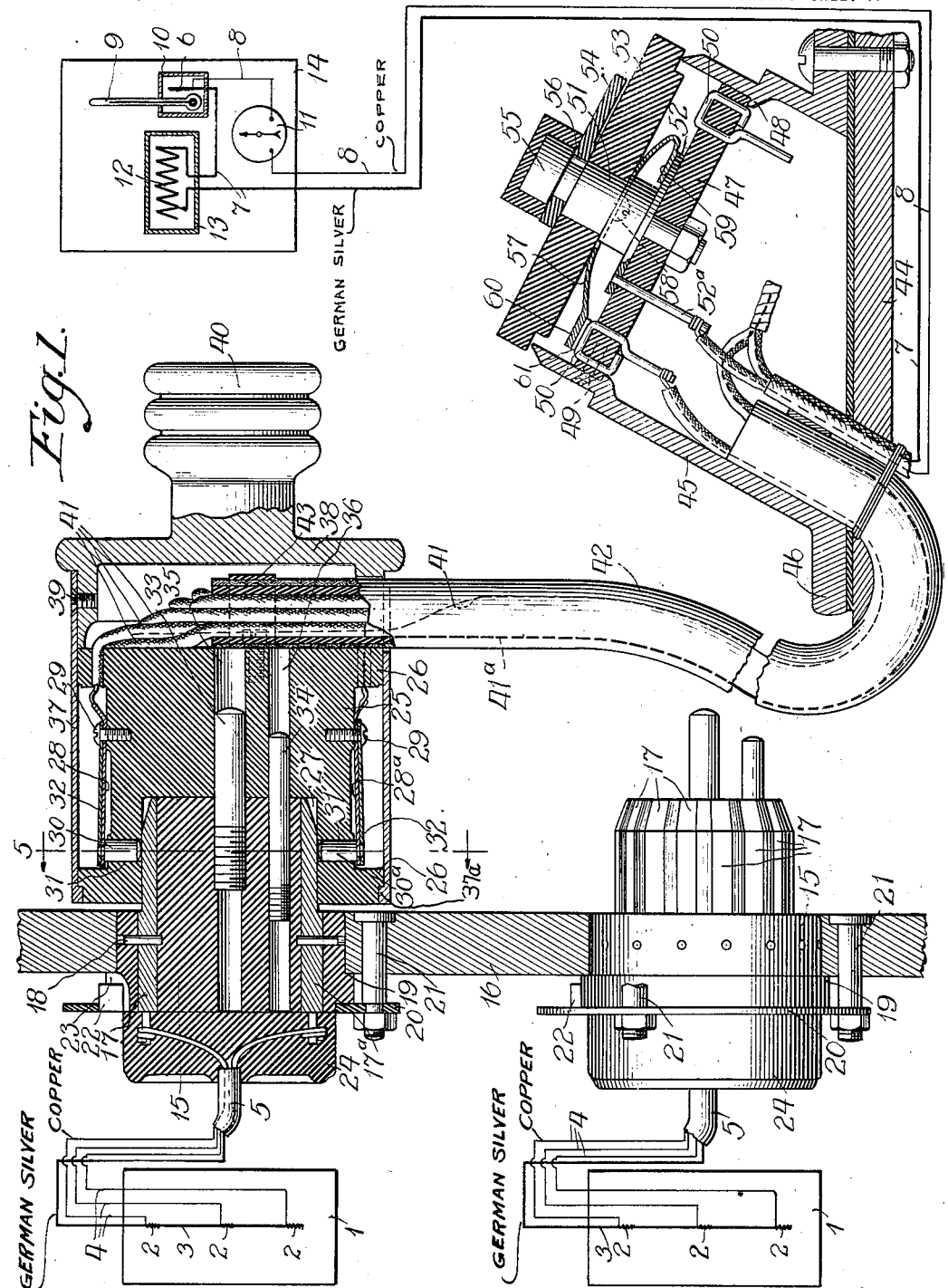

UNITED STATES PATENT OFFICE.

LEONARD H. DES ISLES, OF CHICAGO, ILLINOIS.

ELECTRICAL THERMOMETER SYSTEM.

1,304,277.  Specification of Letters Patent.  Patented May 20, 1919.

Application filed January 21, 1918. Serial No. 212,991.

*To all whom it may concern:*

Be it known that I, LEONARD H. DES ISLES, a citizen of the United States, and a resident of Chicago, county of Cook, and State of Illinois, have invented certain new and useful Improvements in Electrical Thermometer Systems, of which the following is a specification.

The invention relates to thermo-electric systems for quickly ascertaining at a reading station, the temperature at a large number of distant points. Such systems are now in use for determining the temperature at different points or levels in the storage bins or tanks of grain elevators and comprise a number of thermo-electric circuits or couples having junctions located at the points whose temperature is to be determined and a common or comparison device or junction of known temperature, together with switch mechanism whereby any one of the thermo-electric junctions may be connected in circuit with the common or comparison junction and a galvanometer. Heretofore in such systems, the groups of thermo-electric couples for the different tanks or bins have been provided with a common lead or return conductor which is directly connected to the common or comparison junction. For this reason, and since the electro-motive force of a thermo-electric couple is very small, a slight disarrangement, ground or partial ground is apt to disarrange the entire system. Moreover, because such thermo-electric circuits are so easily disarranged, it is quite difficult to locate the source of trouble, particularly where a large number of circuits are employed.

In accordance with the present invention, the system is divided into separate groups of thermo-electric circuits, each group having a set of leads which is insulated from or is entirely independent of the leads of the other groups, and separable multi-contact coupling terminals and suitable switch mechanism are provided for separately connecting each group and the individual junctions thereof to a measuring set which preferably comprises a comparison junction or junctions and a galvanometer.

The invention consists in the features of improvement herein set forth and more particularly pointed out in the appended claims.

A preferred embodiment of the invention is illustrated in the accompanying drawings in which Figure 1 shows a diagram of the circuits and vertical sections of the coupling members and switch mechanism. Fig. 2 is a detail view of the switch, parts being shown in section on the line 2—2 of Fig. 3. Fig. 3 is a view partially in side elevation and partially in section of the switch with the casing broken away. Fig. 4 is a face view of the switch dial. Fig. 5 is a detail section through the coupling members, taken on the line 5—5 of Fig. 1.

As stated, the thermo-electric circuits and the individual thermo-electric junctions are divided into groups, usually one group being employed for each tank or bin of the grain elevator. Two such tanks or bins 1 are indicated diagrammatically in Fig. 1, each being provided with a group of thermo-electric junctions 2 arranged at different points throughout the height thereof. The improved system will usually be applied to quite a number of bins and each bin will usually be provided with a dozen or more junctions preferably located about five feet apart. Each group of junctions is provided with a set or group of independent leads of dissimilar metals. Preferably, each set comprises a common lead 3 of German silver and a series of individual copper leads 4, the ends of which are twisted about and soldered to the common lead 3 to form the thermo-electric junctions 2. In Fig. 1, for convenience, the dissimilar metal conductors of German silver and copper are indicated by heavy and light lines respectively. In the arrangement shown, each set or group of leads is formed into a cable 5 that extends to a central station, at which is provided a plurality of separate multi-contact terminals or coupling members, one for each of the groups or sets of leads.

At the central or reading station, is provided a measuring set which preferably comprises a common thermo-electric junction or junctions whose temperature is known or can be ascertained by a thermometer associated therewith and a galvanometer. In the arrangement indicated in Fig. 1, the common or comparison junction 6 has a German silver lead 7 and a copper lead 8 twisted around and soldered to the lead 7 to form the junction 6. The temperature of this junction is determined by a thermometer 9. Preferably, to avoid the effects of moisture and drafts, the bulb of the thermometer and the junction 6 are sealed within an air and moisture tight casing 10. A galvanometer 11 and preferably also, an adjustable resistance 12 having a low temperature co-efficient, are connected in series with the junction 6. In the form shown, the galvanometer is interposed in the lead 8 and the resistance in the lead 7. To maintain the connections with the resistance, at uniform temperature and prevent interference with the proper operation of the system, the resistance and its connections are inclosed in a casing 13. If the coil of the galvanometer is not of copper, care should be taken that the connections therewith, be maintained at a uniform temperature. For convenience, the casings 10 and 13 and the galvanometer 11 are mounted upon a common base-board 14.

The multi-contact coupling terminals and switch mechanism for connecting the measuring set to the separate groups of thermoelectric circuits and to the individual junctions of each group, can be widely varied in construction, but, for accurate operation, should be of simple form and such that the contacts can be readily maintained in good condition and thus avoid any interference with the low potential thermo-electric currents.

In the arrangement shown, the separate multi-contact terminals are in the form of coupling plugs 15 mounted upon a suitable supporting board 16 and each provided with a circular series of contact pins 17 held in position therein by short transverse pins 18. Each coupling plug is inserted through an opening in the base board 16 and its outer projecting portion and the outer portions of the contact pins are cut away to provide suitable contact surfaces. The inner end of the plug is enlarged to form a shoulder 19 which abuts against the inner face of the board 16 and a washer 20 seated on the extreme inner end of the plug is engaged by bolts 21 which extend through the board 16 to thereby hold the plug in position. To prevent any turning movement of the plug in the board, the washer is provided at one portion with a projection 22 which engages a notch 23 on the inner peripheral portion of the plug.

One of the contact pins 17ª is formed of German silver and the other contact pins of copper. The common German silver lead 3 of the corresponding group is soldered to the projection on the inner end of the contact pin 17ª and the individual copper leads 4 are similarly connected to the other contact pins 17. Preferably, as shown in Fig. 1, the connections between the leads and the contact pins are inclosed in a molded body of wax 24 to thoroughly insulate and protect the same.

A common coupling member or socket and a switch are provided for connecting the contacts of any one of the group of plugs to the measuring set. In the form shown, a common coupling member comprises a cylindrical block 25 of hard rubber or like insulating material having projecting flanges 26 at its ends and a bore or socket 27 formed in its inner end face which is adapted to snugly fit over the projecting outer end portion of any one of the coupling plugs 15. Within the space between the flanges 26 is arranged a circular series of contact strips 28 secured at their outer ends to the block 25 by screws 29 and having contact studs 30 riveted or otherwise fixed to their inner ends. These studs project through radial holes 31 which open into the socket or bore 27 of the common coupling member. A series of springs 32, preferably formed of brass, are secured in place at their outer ends by the screws 29 and extend inwardly over the contact strips 28, the inner ends of the springs being preferably provided with openings which fit over the heads of the rivets that secure the studs 30 to the contact strips. When the coupling socket is disengaged from one of the plugs, the inner rounded ends of the contact studs project inwardly into the bore or socket 27. The outer end of each coupling plug 15 is cut away or beveled, as shown and, when the common coupling member is engaged with one of the plugs, this beveled portion forces the contact studs 30 outwardly against the tension of the springs 32 and the latter react to hold the studs in firm engagement with the faces of the contact pins 17 and 17ª.

One of the contact strips 28ª and its contact stud 30ª are formed of German silver while the other strips and studs are formed of copper and means is provided for so locating the socket member upon any coupling plug that the German silver contact stud 30ª will engage with the similar metal contact pin 17ª of the plug. For this purpose, each plug is provided with an axial projecting pin 33 and with a shorter eccentric pin 34 which are adapted to engage respectively with axial and eccentric holes 35 and 36 extending longitudinally through the block or body portion 25 of the socket member. The axial or central hole 35 of the socket member must first be engaged with the end of the pin 33 and the socket member rotated to bring the eccentric hole or opening 36 in line with the pin 34 before the contacts of the coupling members can be engaged. In this engaged position, the common German silver connection and the individual copper connections through the coupling members are properly formed.

In the construction shown, the coupling plug is provided with a cylindrical casing 37 which fits upon the flanges 26 and is provided with an internal rib 37ª at its inner end seated in a rabbet on the inner flange 26. A hollow cap 38 fits within the outer end of the sleeve or casing 37, is secured thereto by one or more screws 39 and abuts against the outer end flange 26 of the block 25. For convenience, in handling the coupling socket, the cap is provided with an outwardly projecting knob 40. The German silver and copper strips 28ª and 28 are connected respectively to German silver and copper conductors 41ª and 41, the ends of which extend through openings in the outer flange 26. These conductors are preferably grouped together in a cable 42 which extends through an opening formed in the adjacent portions of the cap 38 and casing 37 and is held in place upon the outer end of the block 25 by a U-shaped clamp 43.

This cable extends to a multi-contact switch which is mounted upon a horizontal support 44 and which is provided with a cylindrical casing 45. This casing has a base portion or flange 46 inclined to the axis thereof so that the face or dial of the switch is conveniently held in inclined position. A disk 47 of hard rubber or the like fits within the upper end of the casing 45, rests upon a rabbet or shoulder 48 and is held in place by one or more screws 49. This disk carries a circular series of contacts which are preferably formed of short copper wire sections 50 extended through two series of holes in the disk and having their inner end portions bent over into engagement with the inner face of the disk. The outer portions of these wire sections engage the outer face of the disk and form a series of radial contact strips. One inner portion of each contact wire is extended inwardly so that the copper conductors 41 of the cable 42 can be conveniently and securely soldered thereto.

A central post 51 is secured to the disk 47 and an enlarged portion thereof holds a copper disk 52 snugly against the outer face of the disk 47. This disk is provided with an inwardly projecting copper wire pin 52ª which is connected to the lead or conductor 8 of the measuring set. An indicating disk 53 and an indicating pointer 54 are mounted upon reduced portions of the post 51 and are held in place by a thumb screw 55, the shank of which is threaded into the outer end of the post as most clearly indicated in Fig. 3. An eccentric pin 56 holds the pointer against movement but the disk 53 is rotatable and carries the switch arm or brush that connects the individual contacts 50 with the contact ring or washer 52. This brush comprises an annular copper part 57 which encircles but does not contact with the post, and which is secured to the inner face of the disk 53 by screws 58 arranged on opposite sides of the post. The portions of the disk intermediate the screws are bent downwardly and one portion is provided with an inwardly projecting extension or brush 59 which engages the contact ring or washer 52. The opposite portion of the plate 57 is provided with a projection 60 having a copper shoe 61 thereon which is preferably radially notched and which is adapted to engage with one of the radial contact strips 50. The copper plate or arm 57 has sufficient resiliency to snugly hold the brush 59 and the shoe or brush portion 61 in snug engagement respectively with the washer 52 and one of the contacts 50 and the notched portion of the shoe 61 holds the rotatable member of the switch in adjusted position and against accidental displacement.

The copper conductors 41 of the cable 42 are as stated, connected to the circular series of contacts 50 of the switch, one of these conductors being indicated by a light dotted line in Fig. 1. The German silver conductor 41ª of the cable, indicated by a heavy dotted line, preferably extends into the switch casing and is directly connected to the German silver lead 7 of the measuring set. To distinguish the different metal leads, the German silver leads are shown in heavy lines in the drawing and the copper leads in light lines.

When it is desired to determine the temperatures at different points in any one of the grain tanks or bins, the common socket coupling member is engaged with the proper coupling plug to thereby connect the individual thermo-electric junctions of the particular tank or bin to the contacts of the switch. The brush of the switch can then be rotated by means of the dial 53 to separately connect the individual junctions 2 of the selected group to the common comparison junction 6 and the galvanometer 11 and thereby complete a thermo-electric circuit.

The coupling members and switch properly connect the dissimilar metal leads of opposite polarity of any unknown temperature junction 2 to the leads of corresponding metal or polarity of the common comparison device or thermo-electric junction 6, so that the electro-motive force of the unknown temperature junction reacts against or is opposed to that of the common comparison device or junction of the measuring set. As well known, the current flowing in such a completed circuit is proportional to the difference in temperature of the two opposed junctions. In the position of the switch shown in Fig. 1, a circuit is completed through the upper junction 2 of the tank diagrammatically shown in the upper left hand portion of the figure, and, since the temperature of the common junction 6 can be ascertained by the thermometer 9, the temperature of the distant junction connected thereto can be determined from the reading of the galvanometer. Preferably, a mirror galvanometer is employed having a scale which can be adjusted in accordance with the reading of the thermometer 9 and which is so marked that the temperature of the distant junction is correctly indicated thereon. The resistance 12 is adjusted to eliminate errors due to the different lengths of various circuits and to properly limit the arc through which the galvanometer indicator swings.

The arrangement is such that a very large number of groups of individual unknown temperature junctions can be quickly connected to the measuring set at the reading station. The groups of leads or cables 5 from a number of grain bins or tanks, instead of being extended to the measuring set, terminate at the multi-contact coupling plugs upon the wall plate 16, which is placed in any convenient location. The separate coupling plugs are numbered to correspond to the different bins, and any one of them can be readily connected, as described to the measuring instrument by the connected socket member and switch. The rotating disk or dial 53 of the switch is marked (see Fig. 4), so as to coöperate with the pointer 54 and indicate the depth or level of the junction which in any given position of the switch, is connected to the measuring set.

The connections and parts located at the central reading station can be readily protected and maintained in good order but the groups of junctions and leads in the different tanks, although usually protected by inclosing pipes or casings, are necessarily subjected to the action of large bodies of flowing grain and to varying conditions of temperature and moisture. But inasmuch as the different groups of individual junctions and the leads therefrom are independently segregated or insulated, any disarrangement or grounding of one group can be readily located and will not disarrange the entire system.

The described arrangement of the measuring set or instrument at the reading station is preferred particularly in the application of the system to grain elevators where the differences in temperature between the opposite ends or junctions of the thermo-electric circuits is small. But, changes may be made by those skilled in the art, and the details of construction and arrangement of the multi-contact coupling members and switch mechanism can be varied without departure from the essentials of the invention as defined in the claims. Obviously, dissimilar metals other than those specified could be employed for the junctions and leads of the thermo-electric couples or circuits.

I claim as my invention:—

1. In an electric thermometer system, the combination of a plurality of groups of thermo-electric junctions, each group having a separate, independent set of different metal leads, a common comparison junction, a galvanometer, and means comprising separable coupling members and switch mechanism for detachably connecting the different metal leads of each of said groups and individual junctions thereof to said comparison junction and said galvanometer.

2. In an electric thermometer system, the combination of a plurality of groups of thermo-electric junctions, each group having a set of different metal leads disconnected from the leads of the other groups, a comparison thermo-electric junction, a galvanometer, and means comprising separable, multi-contact coupling and switching devices for separately connecting the individual junctions of any one of said groups to said comparison junction and said galvanometer.

3. In an electric thermometer system, the combination of a plurality of groups of thermo-electric junctions, each group having a separate, independent set of different metal leads, a comparison thermo-electric junction, a galvanometer, and means comprising detachable multi-contact plug-and-socket coupling members and a multi-contact switch for separately connecting the individual junctions of any one of said groups to said comparison junction and said galvanometer.

4. In an electric thermometer system, the combination of a plurality of groups of thermo-electric circuits, each having a set of individual junctions and a separate, independent set of different metal leads, a comparison thermo-electric junction having leads of different metals but like those of said groups, and means for detachably connecting the different metal leads of said comparison junction to the corresponding metal leads of the individual junctions of any one of said groups to complete a thermo-electric circuit.

5. In an electric thermometer system, the combination of a plurality of groups of thermo-electric circuits, each having a set of individual junctions and a separate, independent set of different metal leads, a comparison thermo-electric junction having leads of different metals but like those of said groups, a galvanometer interposed in one of the leads of said comparison junction and means comprising separable coupling members and switch mechanism for detachably connecting the different metal leads of said comparison junction to the corresponding metal leads of the individual junctions of any one of said groups.

6. In an electric thermometer system, the combination of a plurality of groups of thermo-electric couples, each having a set of leads disconnected from the leads of the other group and each set comprising a common lead of different metal from the individual leads, a galvanometer, and means comprising separable coupling members and switch mechanism for separately completing a thermo-electric circuit through said galvanometer and the individual couples of any one of said groups.

7. In an electric thermometer system, the combination of a plurality of groups of thermo-electric couples having separate, independent sets of leads, each set comprising a common lead of different metal from the individual leads, a common comparison or measuring instrument and separable multi-contact coupling and switching devices for detachably connecting the terminals of said common comparison instrument to the leads of any one of said groups.

8. In an electric thermometer system, the combination of a plurality of groups of thermo-electric circuits, each having a set of individual junctions, a plurality of separate, multi-contact terminals, one for each of said groups, a common comparison device, and a switch mechanism detachably connectible to any one of said multi-contact terminals and arranged to coöperate therewith to connect the individual junctions of the corresponding group to said comparison device.

9. In an electric thermometer system, the combination of a plurality of groups of thermo-electric circuits, each having a set of individual junctions, a plurality of separate, multi-contact coupling members, one for each of said groups, a common comparison junction, a common, multi-contact coupling member arranged to detachably engage any one of said group coupling members, and a switch coöperating with said common coupling member to connect the individual junctions of any one group to said comparison junction.

10. In an electric thermometer system, the combination of a plurality of groups of thermo-electric circuits, each having a set of individual junctions, a plurality of separate multi-contact coupling members, one for each of said groups, a comparison thermo-electric junction, a galvanometer, a common multi-contact coupling member arranged to detachably engage any one of said group coupling members, and a multi-contact switch associated and coöperating with said common coupling member to connect the individual junctions of any one group to said comparison junction and said galvanometer.

11. In an electric thermometer system, the combination of a plurality of groups of thermo-electric circuits each having a set of individual junctions and a separate, independent set of different metal leads, a plurality of separate multi-contact terminals, one for the leads of each of said groups, a common comparison thermo-electric junction having leads of different metals but like those of said groups, a galvanometer interposed in one of the leads of said comparison junction, and coupling and switch devices detachably connectible to any one of said group terminals and arranged to connect the different metal leads of said comparison junction to the like metal leads of the individual junctions of the corresponding group.

12. In an electric thermometer system, the combination of a plurality of groups of thermo-electric junctions each group having a separate, independent set of different metal leads, a plurality of separate, multi-contact coupling members, one for the leads of each of said groups, a temperature measuring set having leads of different metals but like those of said groups, said temperature measuring set comprising a comparison junction, and a galvanometer and a resistance connected in series with said comparison junction, a multi-contact coupling member detachably engageable with any one of said group coupling members, and a multi-contact switch associated and coöperating with said common coupling member to connect the leads of said measuring set to the corresponding metal leads of the individual junctions of any one of said groups.

13. In an electric thermometer system, the combination of a plurality of groups of thermo-electric junctions having separate, independent sets of leads, each set comprising a common lead of different metal from the individual leads, a plurality of separate multi-contact terminals, one for the leads of each of said groups, a comparison junction, a galvanometer interposed in one of the leads of said comparison junction, and coupling and switching devices detachably connectible to any one of said terminals and arranged to connect the leads of said comparison couple to the leads of like polarity of any one of said groups.

14. In an electric thermometer system, the combination of a plurality of groups of thermo-electric junctions having separate, independent sets of leads, each set comprising a common lead of different metal from the individual leads, a plurality of separate multi-contact coupling members, one for the leads of each of said groups, a comparison junction having different metal leads, a galvanometer interposed in one of the leads of said comparison couple, a common multi-contact coupling member arranged to detachably engage any one of said group coupling members, and a multi-contact switch associated and coöperating with said common coupling member for connecting the different metal leads of said comparison junction to the corresponding metal leads of said groups.

15. In an electrical thermometer system, the combination of a plurality of thermo-electric circuits having separate, independent leads of different metal, a common comparison thermo-electric junction for said circuits having leads of different metals but like those of said circuits, a galvanometer connected in series with said common junction, and separable plug-and-socket coupling members having pairs of coöperating contacts for separately connecting the leads of said common junction to the like metal leads of any one of said circuits.

16. In an electric thermometer system, the combination with a temperature measuring set, of a number of groups of individual thermo electric junctions, a corresponding number of separate coupling terminals, each having a set of contacts connected to the individual junctions of one of said groups, and means, comprising a common shiftable coupling member detachably engageable with any one of said coupling terminals whereby to select one of said groups, a flexible cable conductor connected to said coupling member, and a selecting switch associated therewith for completing a thermo electric circuit through said temperature measuring set and any desired one of the individual junctions of the selected group.

17. In an electric thermometer system, the combination with a temperature measuring set, of a number of groups of individual thermo electric junctions, each having a separate independent set of different metal leads, a corresponding number of separate coupling terminals, each having a set of contacts connected to the leads of one of said groups, a common relatively shiftable coupling member detachably engageable with any one of said coupling terminals whereby to select one of said groups, leads of different metals but like those of said groups connected to said coupling member, and an associated selecting switch for completing a thermo electric circuit through said temperature measuring set and any desired one of the individual junctions of the selected group.

18. In an electric thermometer system, the combination with a temperature measuring set, of a number of groups of individual thermo electric junctions, each having a separate independent set of different metal leads, a corresponding number of separate coupling terminals, each having a set of contacts connected to the leads of one of said groups, a common, relatively shiftable coupling member detachably engageable with any one of said coupling terminals whereby to select one of said groups, leads of different metals but like those of said groups connected to said coupling member, the latter and said terminals having means for compelling the engagement thereof in definite relation to properly connect like metal leads, and an associated selecting switch for completing a thermo electric circuit through said temperature measuring set and any desired one of the individual junctions of the selected groups.

19. In an electric thermometer system, the combination with a temperature measuring set, of a number of groups of individual thermo-electric junctions, each group having a separate independent set of different metal leads, a corresponding number of separate, multi-contact coupling terminals one connected to the leads of each of said groups, a shiftable, multi-contact coupling member detachably engageable with any one of said group terminals whereby to select one of said groups, a flexible conducting cable connected to said shiftable coupling member and having leads of different metals but like those of said groups, said coupling member and said terminals having means compelling the engagement thereof in definite relation to properly connect like metal leads, and a coöperating, multi-contact, selecting switch for completing a thermo electric circuit through said temperature measuring set and any desired one of the individual junctions of the selected groups.

LEONARD H. DES ISLES.